United States Patent
O'Brien

(10) Patent No.: US 11,378,007 B2
(45) Date of Patent: Jul. 5, 2022

(54) AIRFLOW CONTROL SYSTEM AND METHODS THEREOF

(71) Applicant: Donaldson Company, Inc., Minneapolis, MN (US)

(72) Inventor: Michael P. O'Brien, Ballwin, MO (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 17/206,073

(22) Filed: Mar. 18, 2021

(65) Prior Publication Data

US 2021/0207531 A1 Jul. 8, 2021

Related U.S. Application Data

(63) Continuation of application No. 16/645,904, filed as application No. PCT/US2018/060092 on Nov. 9, 2018.

(Continued)

(51) Int. Cl.
*F02C 7/00* (2006.01)
*F02C 7/055* (2006.01)
(Continued)

(52) U.S. Cl.
CPC .............. *F02C 7/055* (2013.01); *B64D 33/02* (2013.01); *F02C 7/042* (2013.01); *F02C 7/057* (2013.01)

(58) Field of Classification Search
CPC .......... F02C 7/055; F02C 7/057; F02C 7/042; F02C 7/04; B64D 33/02
See application file for complete search history.

(56) References Cited

U.S. PATENT DOCUMENTS

| | | |
|---|---|---|
| 2,381,705 A | 8/1945 | Vokes |
| 3,421,296 A | 1/1969 | Beurer |

(Continued)

FOREIGN PATENT DOCUMENTS

| | | |
|---|---|---|
| EP | 2 003 306 | 12/2008 |
| EP | 3 281 876 A1 | 2/2018 |

(Continued)

OTHER PUBLICATIONS

PCT International Preliminary Report on Patentability for PCT/US2018/060092 dated May 12, 2020 (7 pages).

(Continued)

*Primary Examiner* — Katheryn A Malatek
(74) *Attorney, Agent, or Firm* — Mueting Raasch Group

(57) ABSTRACT

A system and method of an airflow control system for a vehicle is described herein. The airflow control system (100) includes an airflow housing (120) defining an airflow passageway (125) extending between a bypass opening (122) and an intake outlet (124). The airflow housing also defines a duct opening (126) positioned between the bypass opening (122) and the intake outlet (124). The intake outlet (124) may be in fluid communication with an engine intake (12) of the vehicle such that air passes from the bypass opening (122) and/or the duct opening (126) to the engine intake (12). The airflow control system (100) also includes a movable duct (160) movably connected to the airflow housing (120) to selectively allow or prevent air passage through the duct opening (126) and into the engine intake (12), and further includes a bypass door (140) movably connected to the airflow housing (120) to selectively allow or prevent air passage through the bypass opening (122) and into the engine intake (12).

28 Claims, 8 Drawing Sheets

Related U.S. Application Data

(60) Provisional application No. 62/584,387, filed on Nov. 10, 2017.

(51) Int. Cl.
*B64D 33/02* (2006.01)
*F02C 7/042* (2006.01)
*F02C 7/057* (2006.01)

(56) References Cited

U.S. PATENT DOCUMENTS

| | | |
|---|---|---|
| 3,449,891 A * | 6/1969 | Amelio .................. F02B 61/04 55/306 |
| 3,483,676 A | 12/1969 | Sargisson |
| 3,704,721 A | 12/1972 | Schmitz et al. |
| 4,007,891 A | 2/1977 | Sorensen et al. |
| 4,304,094 A | 12/1981 | Amelio |
| 4,919,364 A | 4/1990 | John et al. |
| 5,865,398 A | 2/1999 | Pashea et al. |
| 6,595,742 B2 | 7/2003 | Scimone |
| 7,192,462 B2 | 3/2007 | Stelzer et al. |
| 7,491,253 B2 | 2/2009 | Wilson |
| 8,292,978 B2 | 10/2012 | Krahl |
| 8,439,295 B2 | 5/2013 | Belyew |
| 8,961,634 B2 | 2/2015 | Boyce |
| 9,192,882 B2 | 11/2015 | Zonenberg et al. |
| 9,254,921 B2 | 2/2016 | Braeutigam |
| 9,441,598 B2 | 9/2016 | Futa et al. |
| 9,517,842 B2 | 12/2016 | Brand |
| 9,586,692 B2 | 3/2017 | Bofill et al. |
| 10,023,296 B2 | 7/2018 | Miller et al. |
| 10,221,809 B2 | 3/2019 | Charron et al. |
| 10,829,237 B2 | 11/2020 | Kooiman et al. |
| 11,077,957 B2 | 8/2021 | Parsons et al. |
| 2016/0201600 A1 | 7/2016 | Charron et al. |
| 2018/0043986 A1 | 2/2018 | Miller et al. |
| 2018/0208323 A1 | 7/2018 | Parsons et al. |

FOREIGN PATENT DOCUMENTS

| | | |
|---|---|---|
| EP | 3 281 876 B2 | 1/2019 |
| GB | 1 201 096 | 8/1970 |

OTHER PUBLICATIONS

PCT Search Report and Written Opinion for PCT/US2018/060092 dated Jan. 31, 2019 (11 pages).

* cited by examiner

AIRFLOW CONTROL SYSTEM AND METHODS THEREOF

RELATED APPLICATION

This application is a continuation application of U.S. patent application Ser. No. 16/645,904, filed 10 Mar. 2020, which is a U.S. National Stage Application of International Application No. PCT/US2018/060092 filed 9 Nov. 2018, which was published in English on 16 May 2019 as International Publication No. WO 2019/094765 A1 which claims the benefit under 35 U.S.C. 119(e) of U.S. Provisional Application No. 62/584,387 filed 10 Nov. 2017, and entitled AIRFLOW CONTROL SYSTEM AND METHODS THEREOF, all of which are incorporated herein by reference in their entirety.

FIELD OF THE DISCLOSURE

The disclosure herein relates generally to airflow control systems for use with, for example, vehicles and other equipment. Specifically, airflow control systems that include multiple airflow paths that operate in conjunction with one another.

SUMMARY

Airflow control systems for vehicles and related methods are described herein. In one or more embodiments, the airflow control systems include multiple movable structures to allow or prevent air from traveling into an engine intake. For example, the airflow control system may include a movable duct that provides a passage for air to be filtered before entering the engine intake and a bypass door that provides a passage for air to enter the engine intake without filtering. Further, the movable duct and the bypass door may operate in conjunction such that each move at the same time in an inverse direction of one another (e.g., one moves from open to closed while the other moves from closed to open). Further yet, the motion of both the movable duct and the bypass door may be carried out by a single actuator.

An illustrative airflow control system may include an airflow housing, a movable duct, and a bypass door. The airflow housing may define an airflow passageway extending between a bypass opening and an intake outlet. The airflow housing may further define a duct opening positioned between the bypass opening and the intake outlet. The intake outlet may be in fluid communication with an engine intake of the vehicle such that air passes from the bypass opening and/or the duct opening to the engine intake. The movable duct may be movably connected to the airflow housing to selectively allow or prevent air passage through the duct opening and into the engine intake. The bypass door may be movably connected to the airflow housing to selectively allow or prevent air passage through the bypass opening and into the engine intake.

In one or more embodiments of the airflow control system as described herein, movement of the movable duct is interrelated to movement of the bypass door.

In one or more embodiments of the airflow control system as described herein, the movable duct is movable between a duct open position to allow air to pass through the duct opening and a duct closed position to prevent air from passing through the duct opening, and wherein the bypass door is movable between a bypass open position to allow air to pass through the bypass opening and a bypass closed position to prevent air from passing through the bypass opening.

In one or more embodiments of the airflow control system as described herein, the movable duct moves from the duct open position to the duct closed position when the bypass door moves from the bypass closed position to the bypass open position, and wherein the movable duct moves from the duct closed position to the duct open position when the bypass door moves from the bypass open position to the bypass closed position.

In one or more embodiments of the airflow control system as described herein, the movable duct is in the duct open position when the bypass door is in the bypass closed position, and wherein the movable duct is in the duct closed position when the bypass door is in the bypass open position.

In one or more embodiments of the airflow control system as described herein, at least one of the bypass opening and the duct opening is always at least partially open.

In one or more embodiments of the airflow control system as described herein, the airflow control system may also include an actuator configured to move both the bypass door and the movable duct.

In one or more embodiments of the airflow control system as described herein, the airflow control system may also include a first actuator configured to move the bypass door and a second actuator configured to move the movable duct, wherein the first actuator is different than the second actuator.

In one or more embodiments of the airflow control system as described herein, the airflow control system may also include an actuator coupled to the airflow housing and comprising a linear drive shaft configured to extend and retract in a linear direction and a bypass drive linkage extending between a first end portion and a second end portion, wherein the first end portion of the bypass drive linkage is pivotally connected to the airflow housing about a pivot axis and fixedly coupled to the bypass door such that the bypass door pivots about the pivot axis, wherein the second end portion of the bypass drive linkage is pivotally connected to the linear drive shaft of the actuator, wherein linear movement of the linear drive shaft of the actuator translates to rotational movement of the bypass door through the bypass drive linkage.

In one or more embodiments of the airflow control system as described herein, the airflow control system may also include one or more supports extending along the airflow housing, wherein the movable duct is movably coupled to the one or more supports to move linearly along the one or more supports, and a duct drive linkage extending between a first end portion movably coupled to the movable duct and a second end portion fixedly coupled to the first end portion of the bypass drive linkage, wherein rotational movement of the bypass drive linkage translates to linear movement of the movable duct through the duct drive linkage due to the one or more supports.

In one or more embodiments of the airflow control system as described herein, the airflow control system may also include a filter assembly positioned outside of the duct opening such that air passing from the duct opening to the engine intake must pass through the filter assembly before passing through the duct opening.

In one or more embodiments of the airflow control system as described herein, the movable duct comprises a first movable duct and a second movable duct and the duct opening comprises a first duct opening and a second duct opening, wherein the first and second movable ducts are movably connected to the airflow housing to selectively allow or prevent air passage through the first and second duct openings, respectively, and into the engine intake.

In one or more embodiments of the airflow control system as described herein, the bypass door is pivotally coupled to the airflow housing within the bypass opening such that the bypass door pivots about a pivot axis between a bypass open position to allow air passage through the bypass opening and a bypass closed position to prevent air passage through the bypass opening.

In one or more embodiments of the airflow control system as described herein, the airflow housing comprises one or more supports, wherein the movable duct is movably coupled to the one or more supports to move linearly along the one or more supports.

An illustrative aircraft may include an engine housing defining an engine intake to receive air flow, wherein the engine housing is configurable between a forward flight configuration and a hover configuration, and an airflow control system as described herein, wherein the movable duct prevents air from passing through the duct opening and the bypass door allows air to pass through the bypass opening when in the bypass configuration, and wherein the movable duct allows air to pass through the duct opening and the bypass door prevents air passing through the bypass opening when in the filtered configuration.

An illustrative method of airflow control may include moving a bypass door from a bypass open position, allowing air to pass through a bypass opening, to a bypass closed position, preventing air from passing through the bypass opening, wherein an airflow housing defines an airflow passageway extending between the bypass opening and an intake outlet and the airflow housing also defines a duct opening positioned between the bypass opening and the intake outlet, wherein the intake outlet is in fluid communication with an engine intake such that air passes from the bypass opening and/or the duct opening to the engine intake. The method may also include moving a movable duct from a duct closed position, preventing air from passing through the duct opening, to a duct open position, allowing air to pass through the duct opening, wherein moving the bypass door from the bypass open position to the bypass closed position occurs simultaneously with moving the movable duct from the duct closed position to the duct open position. Further, the method may include moving the bypass door from the bypass closed position to the bypass open position and moving the movable duct from the duct open position to the duct closed position, wherein moving the bypass door from the bypass closed position to the bypass open position occurs simultaneously with moving the movable duct from the duct open position to the duct closed position.

In one or more embodiments of the method as described herein, moving the bypass door between the bypass open position and the bypass closed position comprises transitioning through a bypass intermediate position and moving the movable duct between the duct closed position and the duct open position comprises transitioning through a duct intermediate position, wherein the bypass door transitions through the bypass intermediate position at the same time that the movable duct transitions through the duct intermediate position, wherein air passes through the bypass opening when the bypass door is in the bypass intermediate position and air passes through the duct opening when the movable duct is in the duct intermediate position.

In one or more embodiments of the method as described herein, moving the bypass door between the bypass open position and the bypass closed position comprises pivoting the bypass door within the bypass opening about a pivot axis.

In one or more embodiments of the method as described herein, moving the bypass door from the bypass open position to the bypass closed position and moving the movable duct from the duct closed position to the duct open position comprises moving an actuator from a first position to a second position, and wherein moving the bypass door from the bypass closed position to the bypass open position and moving the movable duct from the duct open position to the duct closed position comprises moving the actuator from the second position to the first position.

In one or more embodiments of the method as described herein, the method may also include filtering air passing from the duct opening to the engine intake before passing through the duct opening.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWING

The disclosure may be more completely understood in view of the following description of illustrative embodiments in connection with the accompanying drawings.

DESCRIPTION OF ILLUSTRATIVE EMBODIMENTS

Figure 1:
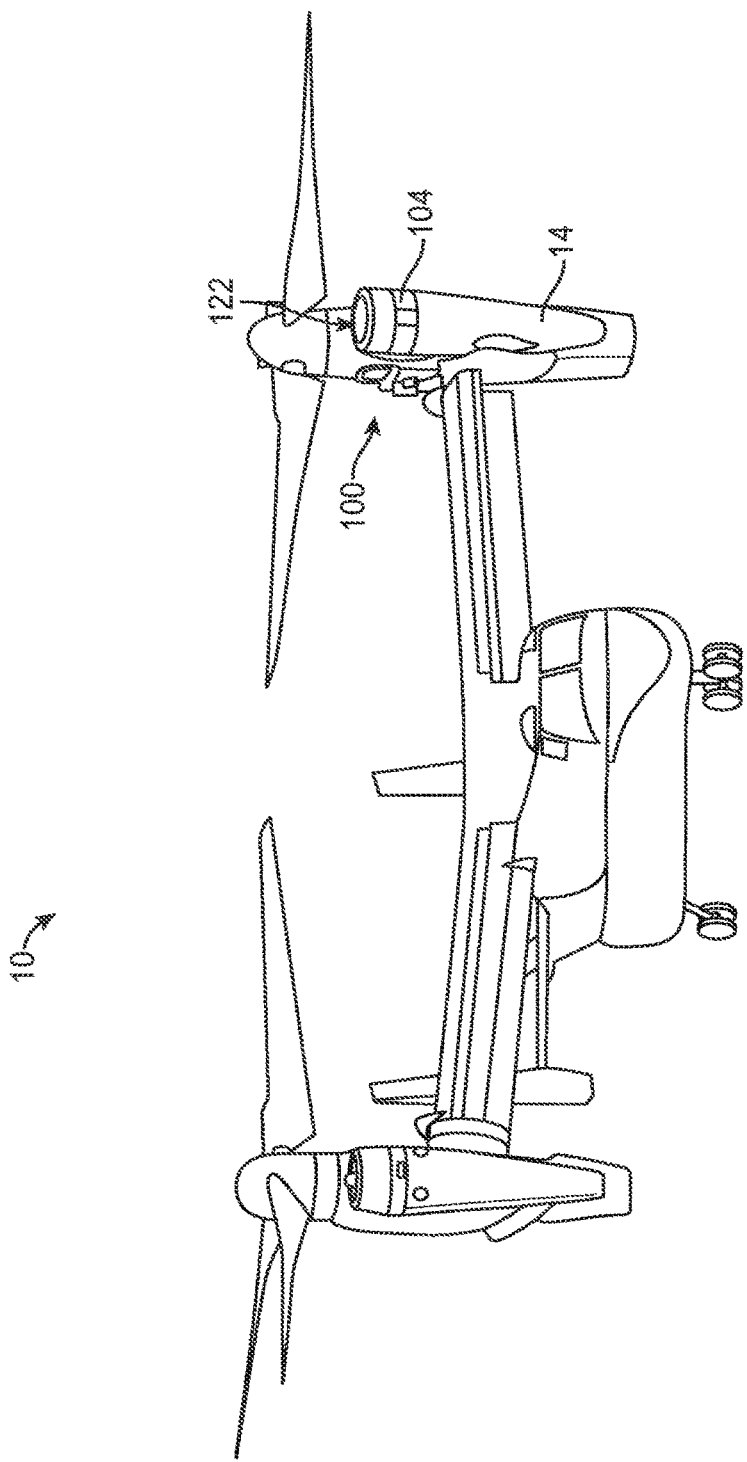
FIG. 1 is a perspective view of one illustrative embodiment of a vehicle incorporating an airflow control system as described herein.

In the following description of illustrative embodiments, reference is made to the accompanying figures of the drawing, which form a part hereof, and in which are shown, by way of illustration, specific embodiments. It is to be understood that other embodiments may be utilized and structural changes may be made without departing from the scope of the present invention.

The disclosure herein includes illustrative embodiments of systems, apparatus, structures, and methods for an airflow control system for an aircraft including a bypass door and a movable duct. The bypass door and movable duct may be movable to open and close a bypass opening and a duct opening, respectively, to provide a passageway for air to travel from the external environment to an engine intake. The bypass door and movable duct may work together (e.g., be linked together and/or use a single actuator/motor), but in opposite directions, to ensure that at least one of the bypass opening and the duct opening are completely open or that both the bypass opening and the duct opening are at least partially open to provide the engine intake with air. Additionally, the bypass door and movable duct may be physically connected such that movement of one results in the movement of the other. For example, as the movable duct opens, the bypass door closes, and when the movable duct closes, the bypass door opens. Further, external air must pass through a filter assembly before passing through the duct opening to the engine intake, but air passing from the bypass opening to the engine intake does not pass through the filter assembly over the duct opening. As such, air passing through the bypass opening may enter the engine intake unfiltered.

The airflow control system described herein may be implemented on aircraft, or any other vehicle, that operates in multiple different configurations. For example, in a first configuration (a filtered configuration), air passing to the engine intake may need to pass through a filter assembly and, therefore, may travel through a filter assembly to the duct opening. In a second configuration (e.g., a bypass configuration), air passing to the engine intake may need to bypass the filter assembly and proceed directly to the engine intake. Further, in the first configuration in which air passes through the filter assembly, the external air may include much more debris and sediment, making additional filtering beneficial, than when in the second configuration.

In one or more embodiments, the airflow control system described herein may be implemented on a vertical take-off and landing (VTOL) aircraft (e.g., a V-22 aircraft) that operates in both a forward flight configuration and a hover configuration. In other words, the VTOL aircraft may be configured to adjust the orientation of the engines and/or rotor blades to combine the functionality of a conventional helicopter with the long-range and high-speed abilities of a turboprop aircraft. When the aircraft is in a hover configuration (e.g., during take-off or landing), the increased downward wind speed may produce additional debris and sediment that could affect the engine intake if not filtered out of the intake air. Therefore, the airflow control system described herein opens the duct opening, which requires air passage through a filter assembly before entering the duct opening to the engine intake, and closes the bypass opening to prevent undesired debris and sediment from entering the engine intake (e.g., in the filtered configuration). On the other hand, when the aircraft is in a forward flight configuration (e.g., while cruising), the forward-facing bypass opening may be opened to maximize the amount of air passing to the engine intake and the duct opening may be closed to prevent leakage or back draft of air passing between the bypass opening and the engine intake (e.g., in the bypass configuration). For example, having the duct opening closed prevents excess air from exiting back out through the filters (e.g., the outer mold line of the aircraft) and prevents spillage (which causes drag and reduces aircraft performance and range). Because the aircraft is at a cruising speed and altitude, the airflow control system may not necessarily require air to pass through a filter assembly, as may be needed in the hover configuration. It is noted that, while the forward flight configuration may be described in conjunction with the bypass configuration and the hover configuration may be described in conjunction with the filtered configuration, the aircraft may operate such that the airflow control system may, if desired, be in the bypass configuration when the aircraft is in the hover configuration and the airflow control system may, if desired, be in the filtered configuration when the aircraft is in the forward flight configuration.

One illustrative embodiment of an airflow control system within a vehicle 10 is depicted in FIG. 1. Specifically, FIG. 1 illustrates a V-22 Osprey aircraft, however, the airflow control system described herein may be applied to airflow systems of a variety of vehicles and/or equipment. For example, the airflow control system may be implemented within helicopters, fixed wing aircraft, etc.

The vehicle 10 may include an engine housing 14 that is configurable between a forward flight configuration (not shown) and a hover configuration (e.g., as shown in FIG. 1). The vehicle 10 may include an airflow control system 100 as described herein. In some embodiments, the airflow control system 100 may be retrofitted onto existing components or structure of a vehicle. The airflow control system 100 may include an inlet to receive air from the external environment to feed the engine during operation. For example, as described further herein, the airflow control system 100 may include a bypass opening 122 proximate a front end of the engine housing 14 and may include a duct opening (not shown), which is covered by a filter assembly 104 in FIG. 1. As described herein, air from the external environment may pass through the airflow control system 100 through one or both the bypass opening 122 and the duct opening/filter assembly 104.

Figure 2A:
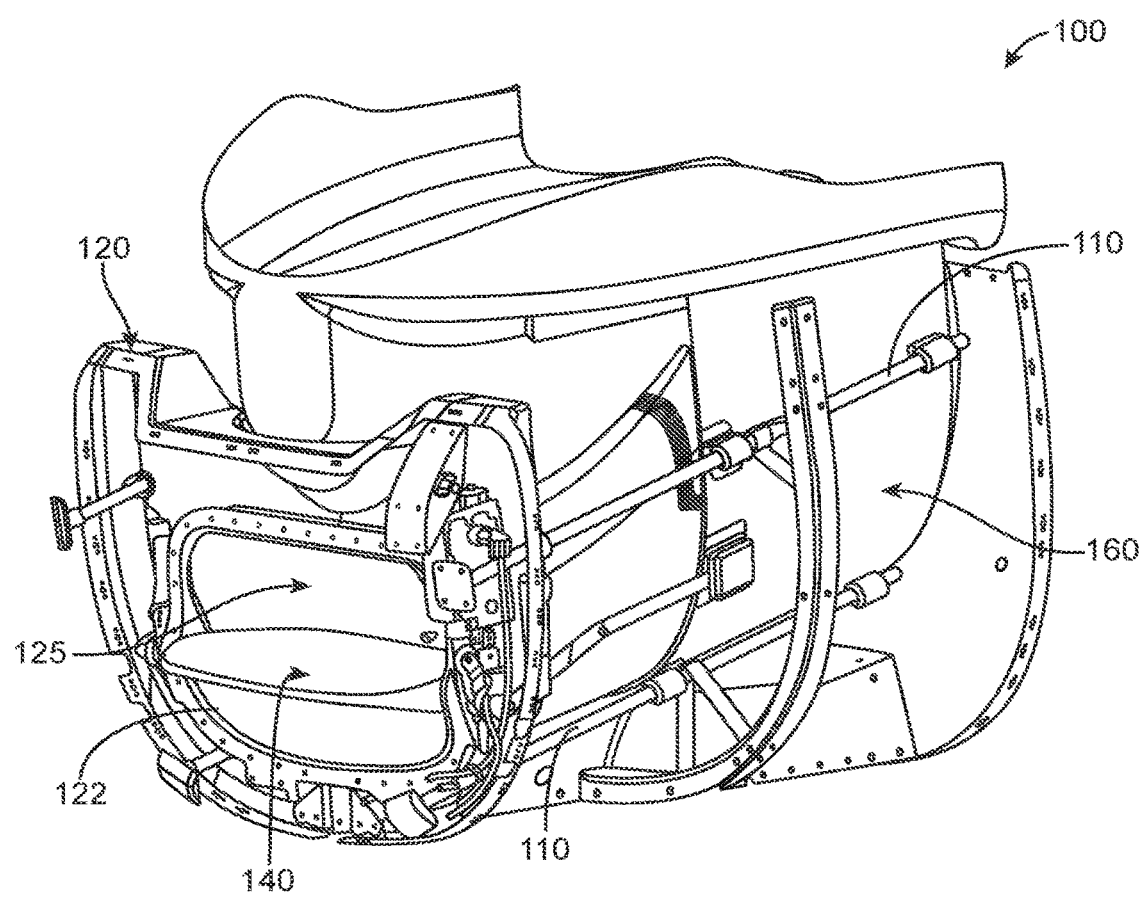
FIG. 2A is a perspective view of one illustrative embodiment of an airflow control system with a bypass door in a bypass open position and a movable duct in a duct closed position.
Figure 3A:
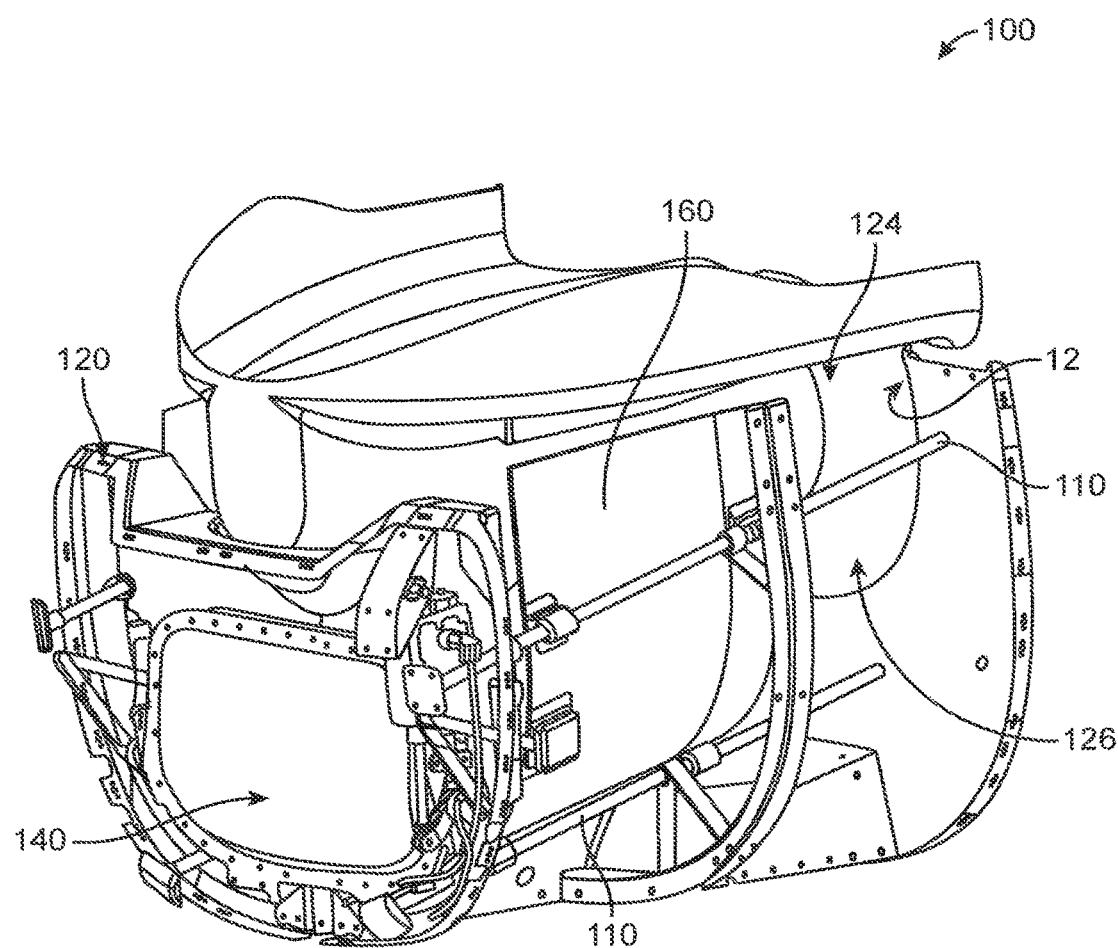
FIG. 3A is a perspective view of another illustrative embodiment of an airflow control system with a bypass door in a bypass closed position and a movable duct in a duct open position.

FIGS. 2A and 3A depict an illustrative airflow control system 100 with a bypass door 140 and a movable duct 160 in two different configurations. The airflow control system 100 may include an air housing 120 defining an airflow passageway 125 extending between a bypass opening 122 and an intake outlet 124 (e.g., the intake outlet 124 is shown in FIG. 3A). The airflow housing 120 may further define a duct opening 126 (e.g., as shown in FIG. 3A in front of the intake outlet 124) positioned between the bypass opening 122 and the intake outlet 124. In other words, the duct opening 126 may be positioned such that air passes from the duct opening 126 to the intake outlet 124 without passing through the bypass opening 122. The intake outlet 124 may be in fluid communication with an engine intake 12 of the aircraft 10 such that air passes from the bypass opening 122 and/or the duct opening 126 to the engine intake 12 through the intake outlet 124.

The airflow control system 100 may also include a bypass door 140 movably connected to the airflow housing 120 to selectively allow or prevent air passage through the bypass opening 122 and into the engine intake 12. In other words, the bypass door 140 may move to a position such that the bypass opening 122 may be generally unobstructed such that air can freely pass through the bypass opening 122. Also, the bypass door 140 may move to another position such that the bypass opening 122 may be completely or almost completely obstructed such that air cannot pass through the bypass opening 122. The bypass door 140 and corresponding bypass opening 122 may be any suitable shape and size, e.g., a perimeter of the bypass door 140 may substantially match a perimeter of the bypass opening 122 to, e.g., prevent air from passing through the bypass opening 122 when the bypass door 140 is closed. In some embodiments, the bypass door 140 may define a thinner profile (e.g., a reduced thickness) to reduce the amount of air resistance when the bypass door 140 is open (e.g., as shown in FIG. 2A).

Figure 4:
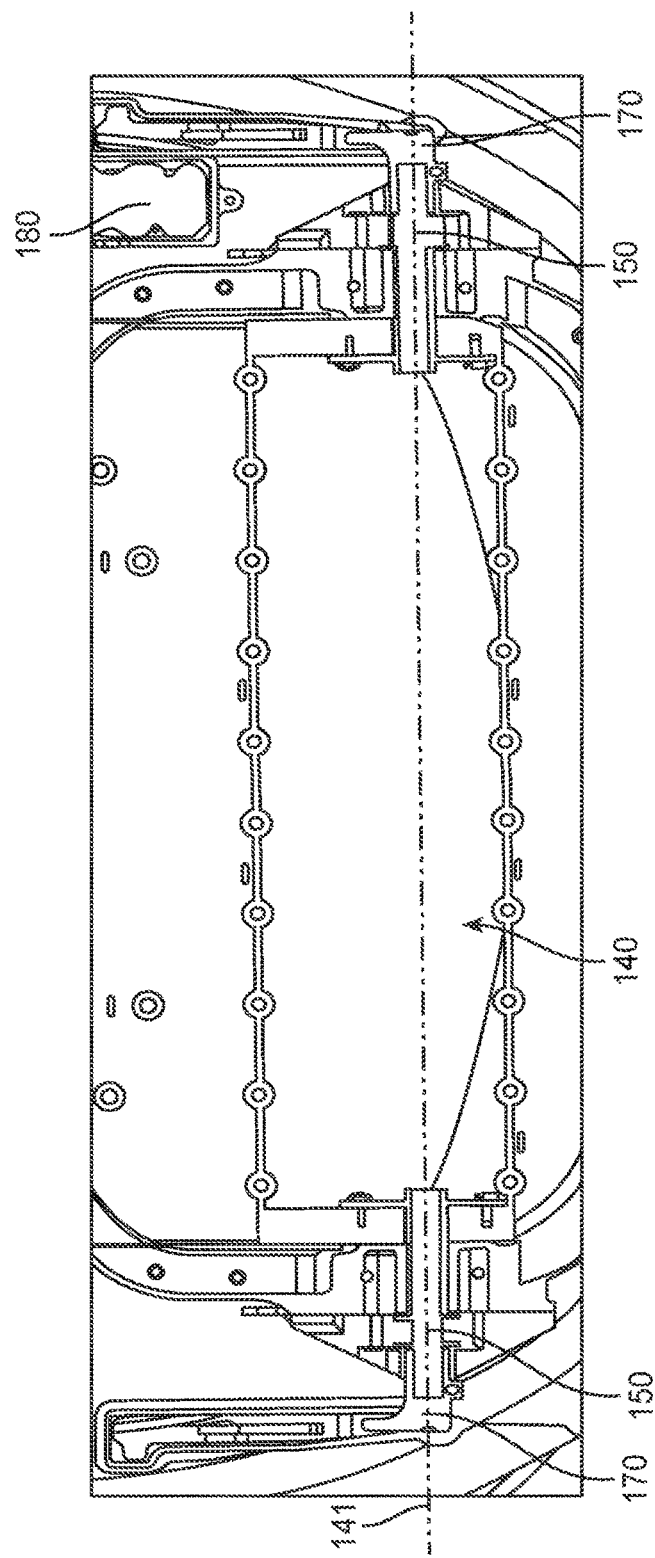
FIG. 4 is a cross-sectional view of the bypass door of FIG. 3A.

In one or more embodiments, the bypass door 140 may be pivotally coupled to the airflow housing 120 within the bypass opening 122. As such, the bypass door 140 may pivot about a pivot axis 141 to open or close the bypass opening 122. The pivot axis 141 may be located anywhere on the airflow housing 120 along the bypass opening 122. For example, the pivot axis 141 may be located at the top of the bypass opening 122, the bottom of the bypass opening 122, or anywhere therebetween. Also, the pivot axis 141 may be oriented vertically or horizontally. As shown in FIG. 4, the pivot axis 141 is located proximate the middle of the bypass opening 122 along a horizontal orientation. When the bypass door 140 is pivoted in a bypass closed position (e.g., as shown in FIG. 3A), the bypass door 140 coincides with the edges of the bypass opening 122 and may be perpendicular to the direction of airflow through the bypass opening 122 (e.g., to maximize the surface area of the bypass door 140 blocking the air). When the bypass door 140 is pivoted in a bypass open position (e.g., as shown in FIG. 2A), the bypass door may be generally parallel to the direction of airflow through the bypass opening 122 (e.g., to minimize the profile of the bypass door 140 that impedes the air flow through the bypass opening 122).

Further, the airflow control system 100 may also include a movable duct 160 (e.g., a sliding duct) movably (e.g., slidably) connected to the airflow housing 120 to selectively allow or prevent air passage through the duct opening 126 and into the engine intake 12. In other words, the movable duct 160 may move to a position such that the duct opening 126 may be generally unobstructed such that air can freely pass through the duct opening 126. Also, the movable duct 160 may move to another position such that the duct opening 126 may be completely or almost completely obstructed such that air cannot pass through the duct opening 126.

The movable duct 160 and the duct opening 126 may take any corresponding shape and/or size. For example, as illustrated in FIGS. 2A and 3A, the duct opening 126 may define a semicircular shape including two separate openings (only the near duct opening is visible). The airflow housing 120 may include a bottom portion (e.g., a drain strut) extending between the bypass opening 122 and the intake outlet 124 that separates the two duct openings and be closed such that air cannot pass through the bottom portion. Further, the movable duct 160 may include multiple portions (e.g., a first movable duct and a second movable duct) that are movable to cover the corresponding duct opening 126. The second movable duct and second duct opening are not illustrated in FIGS. 2A and 3A, but are generally mirror images of the movable duct 160 and duct opening 126 as shown.

The movable duct 160 may be movably connected to the airflow housing 120 in any suitable way. For example, the airflow control system 100 may include one or more supports 110 (e.g., support tubes) extending along the airflow housing 120 that couple the movable duct 160 to the airflow housing 120. For example, the one or more supports 110 may be coupled to the airflow housing 120 (e.g., using brackets) and the movable duct 160 may be movably coupled to the one or more supports 110. The airflow control system 100 may include any number of supports 110. Specifically, the airflow control system 100 illustrated in FIGS. 2A and 3A includes two supports 110 (for each movable duct 160). The movable duct 160 may be movably coupled to the one or more supports 110 to move the movable duct 160 linearly along the one or more supports 110 (e.g., along linear bearings). Further, the one or more supports 110 may include a stopping member that is configured to restrict movement of the movable duct 160 along the one or more supports 110 (e.g., in a duct open position or a duct closed position). In other words, the stopping member may prevent the movable duct 160 from moving too far along the one or more supports 110.

Figure 5:
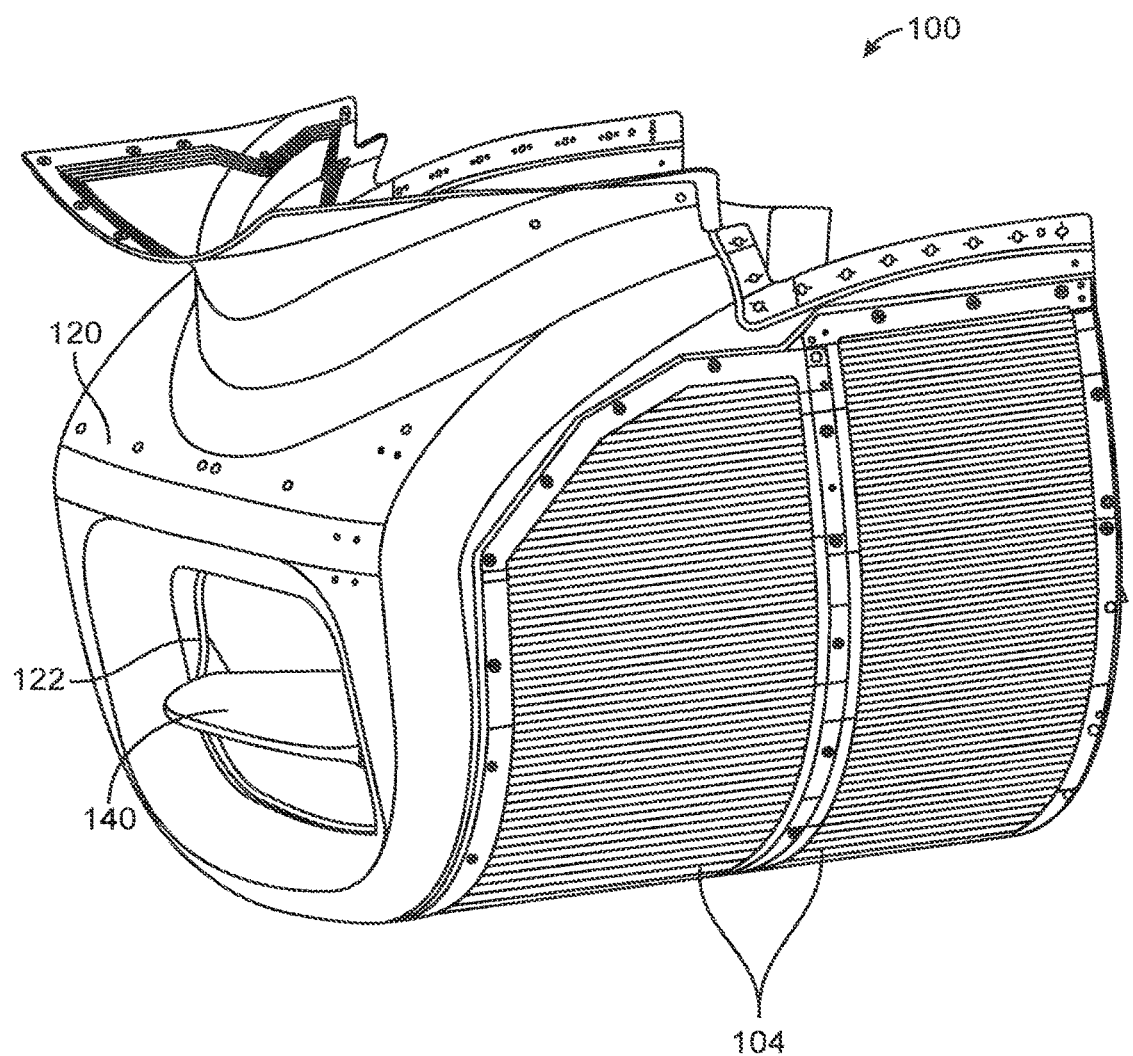
FIG. 5 is a perspective view of the airflow control system of FIG. 2A including a filter assembly.

The airflow control system 100 may also include a filter assembly 104 positioned outside of the duct opening 126 as illustrated in FIG. 5. The filter assemblies 104 used in one or more embodiments of the airflow control system 100 may include one or more filters configured to provide filtering for air passing through the duct openings 126. The depicted illustrative embodiments of the filter assembly 104 includes two separate filters. Other embodiments may include only one (e.g., larger) filter or three or more filters as needed. The filter assembly 104 may be positioned such that air passing from the duct opening 126 to the engine intake 12 must pass through the filter assembly 104 before passing through the duct opening 126.

Each of the bypass door 140 and the movable duct 160 may be configured to open and close the corresponding opening (e.g., bypass opening 122 and duct opening 126, respectively). For example, the movable duct 160 may be movable between a duct open position (e.g., as shown in FIG. 3A) to allow air to pass through the duct opening 126 (and to the engine intake 12) and a duct closed position (e.g., as shown in FIG. 2A) to prevent air from passing through the duct opening 126 (and to the engine intake 12). Due to the positioning of the filter assembly 104 (e.g., as shown in FIG. 5), air passing through the duct opening 126 when the movable duct 160 is in the duct open position must first pass through the filter assembly 104.

Further, the bypass door 140 may be movable between a bypass open position (e.g., as shown in FIG. 2A) to allow air to pass through the bypass opening 122 (and to the engine intake 12) and a bypass closed position (e.g., as shown in FIG. 3A) to prevent air from passing through the bypass opening 122 (and to the engine intake 12). It is noted that, preventing air from passing through a particular opening does not necessarily equal complete closure of the opening, but rather indicates that air is restricted from passing through the opening because the size of the opening is significantly reduced as compared to its size when in the open configuration. In one or more embodiments, the bypass door 140 or movable duct 160 may reduce the size of the opening (e.g., when "closed") by 50% or more, 60% or more, 70% or more, 80% or more, 90% or more, etc.

In one or more embodiments, the bypass door 140 and the movable duct 160 may be configured to move in conjunction or together with one another. In other words, movement of the movable duct 160 may be interrelated or linked to movement of the bypass door 140. Specifically, the movable duct 160 and the bypass door 140 may move in opposite directions (e.g., open/closed and closed/open) from one another at the same time.

For example, the movable duct 160 may move from the duct open position to the duct closed position when the bypass door 140 moves from the bypass closed position to the bypass open position. Also, the movable duct 160 may move from the duct closed position to the duct open position when the bypass door 140 moves from the bypass open position to the bypass closed position.

Due to the relationship between the movement of each of the bypass door 140 and the movable duct 160, one may be closed while the other is open and vice versa. For example, the movable duct 160 may be in the duct open position when the bypass door 140 is in the bypass closed position (e.g., as shown in FIG. 3A). Specifically, FIG. 3A illustrates the airflow control system 100 in the filtered configuration so that the bypass opening 122 is closed (e.g., preventing airflow through the bypass opening 122) and airflow is forced to pass through the open duct openings 126 (and, thus, the filter assembly 104). The aircraft may be in either of the forward flight configuration or the hover configuration when the airflow control system is in the filtered configuration.

For example, if the aircraft enters icing conditions, the bypass door 140 may be closed to protect ice from accruing inside the passageway 125, which could then break loose and potentially damage the engine. With air passing through the duct openings 126, ice would be less likely to reach the engine. Also, for example, if the aircraft enters a sandstorm, flies over forest fires, flies through volcanic ash, etc., the filter assembly 104 would provide filtered air with the bypass door 140 closed and the movable ducts 160 open. Even further, for example, in the filtered configuration, the filter assembly 104 may protect the engine from salt damage if the aircraft is hovering low over salt water (e.g., salt entering the engine may cause rapid engine deterioration).

Also, the movable duct 160 may be in the duct closed position when the bypass door 140 is in the bypass open position (e.g., as shown in FIG. 2A). Specifically, FIG. 2A illustrates the airflow control system 100 in the bypass configuration so that air flows through the bypass opening 122, and the closed duct openings 126 block air from the filter assembly 104, to the engine intake 12. The closing of the movable ducts 160 and the opening of the bypass door 140 may occur in connection with (e.g., in response to) the vehicle 10 entering the forward flight configuration or the hover configuration, and vice versa. By maintaining the movable duct 160 in the duct closed position when the bypass door 140 is in the bypass open position, the movable duct 160 may contain airflow passing from the bypass opening 122 to the engine intake 12. Blocking airflow entering the airflow passageway 125, through the bypass opening 122, from leaving the airflow passageway 125, through the duct opening 126, may help reduce outflow and spillage, which may reduce aircraft drag. Additionally, the closed movable ducts 160 (e.g., in the duct closed position) may pressurize the bypass opening 122 to help mitigate engine distortion. The aircraft may be in either of the forward flight configuration or the hover configuration when the airflow control system is in the bypass configuration.

In one or more embodiments, the movement of the movable duct 160 and the bypass door 140 may be configured such that at least one of the bypass opening 122 and the duct opening 126 may always be at least partially open. For example, because the movable duct 160 and the bypass door 140 may be configured to move together such that the movable duct 160 moves from open to closed while the bypass door 140 moves from closed to open, and vice versa, at least one of the bypass door 140 and the movable duct 160 may be starting to open when the other is starting to close (e.g., at least one may be always partially open). As a result of this relationship between the movable duct 160 and the bypass door 140, the airflow control system 100 may, when operating as designed, never be in position that the bypass opening 122 and the duct opening 126 are both closed at the same time and prevent airflow to the engine. For example, if an actuator that moves both the bypass door 140 and the movable duct 160 became inoperable, airflow would still be allowed to pass to the engine intake 12 (e.g., through at least a portion of the bypass opening 122 and/or the duct opening 126) regardless of whether the engine housing 14 is, e.g., in the forward flight configuration or the hover configuration, or if the airflow control system 100 is in the filtered configuration, bypass configuration, or somewhere therebetween (e.g., such that there will always be air flow to the engine).

Figure 2B:
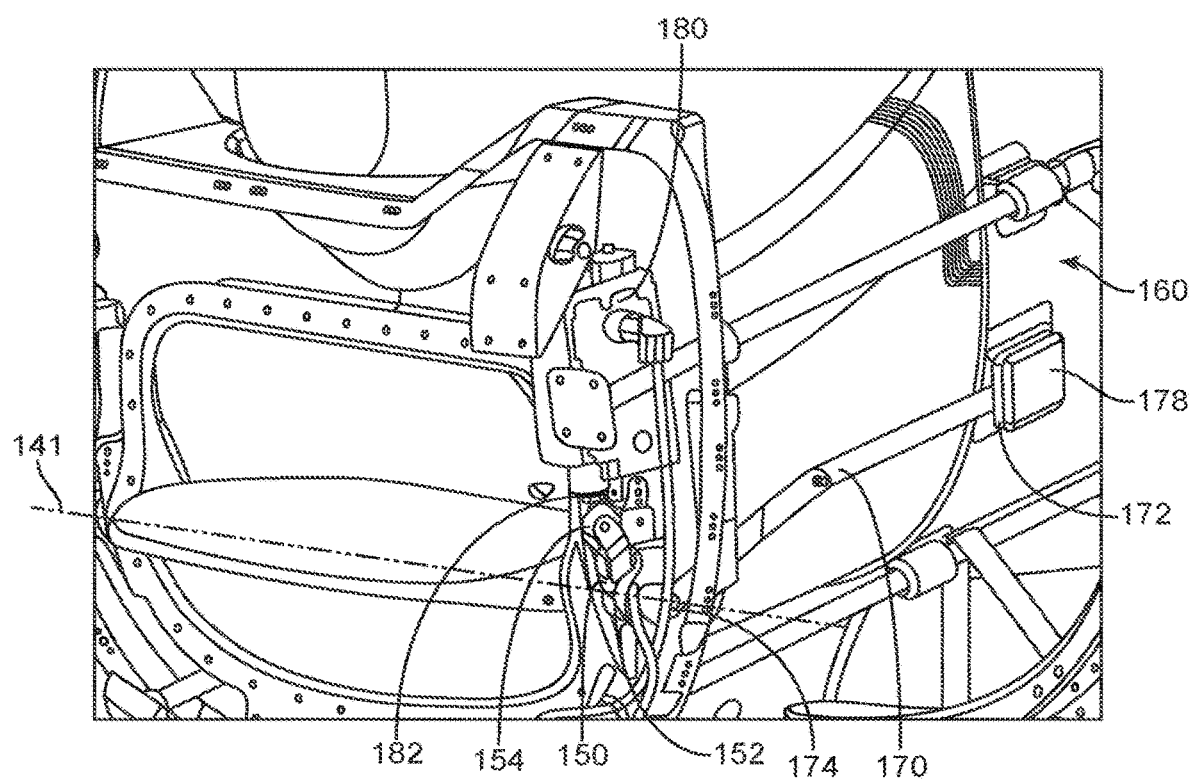
FIG. 2B is an expanded view of the airflow control system of FIG. 2A.
Figure 3B:
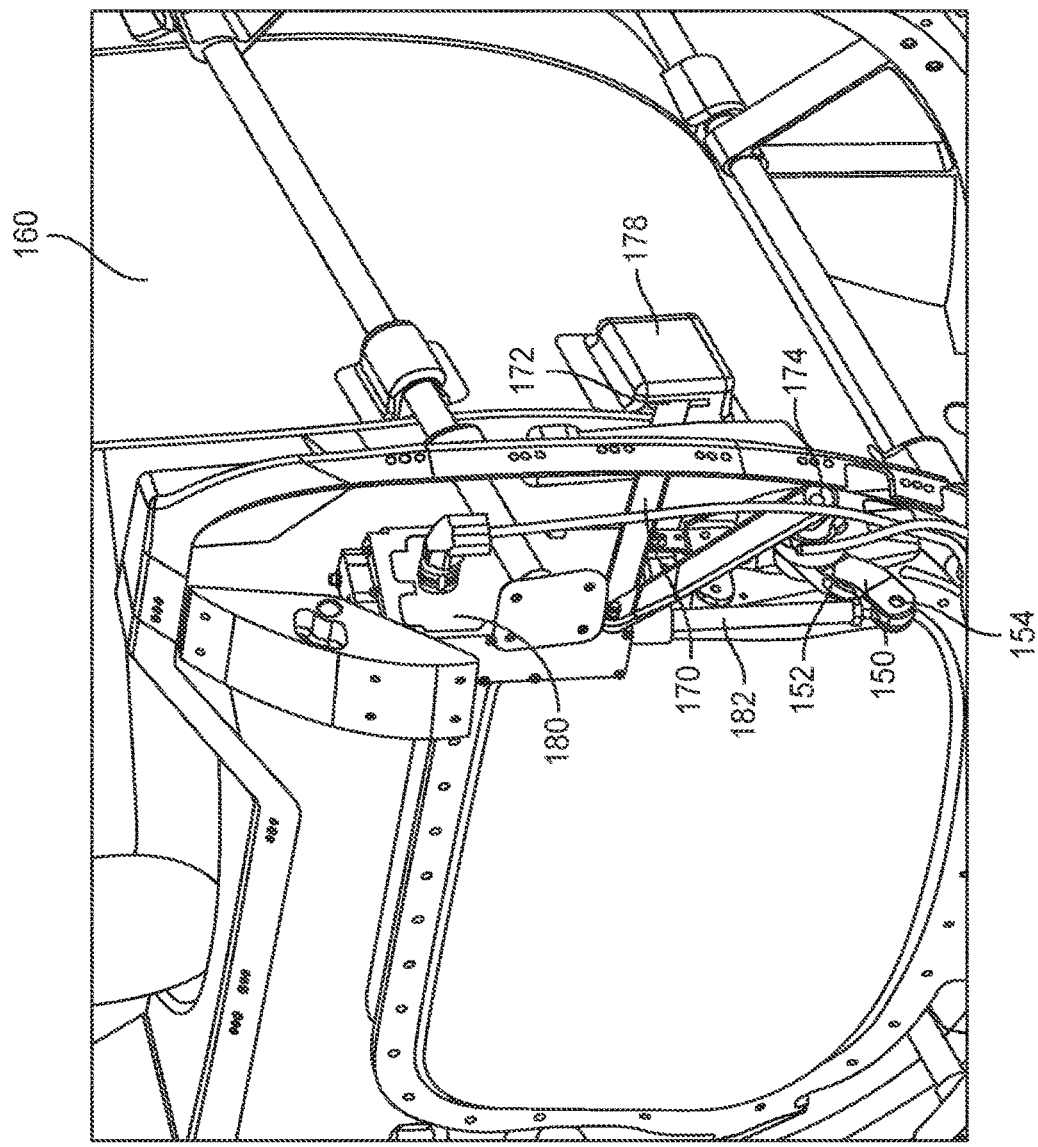
FIG. 3B is an expanded view of the airflow control system of FIG. 3A.

In one or more embodiments, the airflow control system 100 may include an actuator 180, as shown in FIGS. 2B, 3B, and 4, configured to move both the bypass door 140 and the movable duct 160. For example, in an airflow control system having limited control channels and limited additional power available (e.g., no additional current draw), a single actuator may be used. In other embodiments, the airflow control system 100 may include a first actuator configured to move the bypass door 140 and a second actuator configured to move the movable duct 160 (e.g., the first actuator is different than the second actuator). The actuator 180 may be coupled to the airflow housing 120 in a variety of different ways. For example, the actuator 180 may be pivotally coupled to the airflow housing 120 to allow for the actuator 180 to pivot through an arc while moving the bypass door 140 as described further herein. The actuator 180 may include a linear drive shaft 182 configured to extend and retract (from a housing of the actuator 180) in a linear direction. It is noted that the actuator 180 may be any suitable actuation device. For example, the actuator 180 may be a hydraulic motor, an electric motor with a gearhead and screw drive, a pulley and cable, a rack and pinion, etc.

The airflow control system 100 may also include a bypass drive linkage 150 extending between a first end portion 152 and a second end portion 154. The first end portion 152 of the bypass drive linkage 150 may be pivotally connected to the airflow housing 120 about a pivot axis 141 and fixedly coupled to the bypass door 140 such that the bypass door 140 pivots about the pivot axis 141 (e.g., between the bypass open position and the bypass closed position). The second end portion 154 of the bypass drive linkage 150 may be pivotally connected to the linear drive shaft 182 of the actuator 182. Linear movement of the linear drive shaft 182 of the actuator 180 may translate to rotational movement of the bypass door 140 through the bypass drive linkage 150. For example, as the linear drive shaft 182 extends along the linear direction, the linear drive shaft 182 forces the second end portion 154 of the bypass drive linkage 150 through an arc about the pivot axis 141. This pivot about the pivot axis 141 of the second end portion 154 of the bypass drive linkage 150 then rotates the bypass door 140 at the same rate because the bypass drive linkage 150 is fixedly coupled to the bypass door 140.

Further, the airflow control system 100 may include a duct drive linkage 170 extending between a first end portion 172 movably coupled to the movable duct 140 (e.g., contained within a linkage housing 178 as shown in FIGS. 2B and 3B) and a second end portion 174 fixedly coupled to the first end portion 152 of the bypass drive linkage 150. Rotational movement of the bypass drive linkage 150 may then translate to linear movement of the movable duct 140 through the duct drive linkage 170 due to the one or more supports 110. In other embodiments, the duct drive linkage 170 and the bypass drive linkage 150 may include any suitable configuration or mechanism (e.g., whether a linkage or some other mechanism) to transfer motion as described herein.

For example, the duct drive linkage 170 includes a two-bar linkage extending between the movable duct 160 and the bypass drive linkage 150. When the bypass drive linkage 150 rotates in a first direction, the duct drive linkage 170 folds to decrease the distance between the bypass door 140 and the movable duct 160—moving the movable duct 160 away from the duct opening 126 (e.g., as shown in FIG. 3B). When the bypass drive linkage 150 rotates in a second direction opposite the first direction, the duct drive linkage 170 extends to increase the distance between the bypass door 140 and the movable duct 160—moving the movable duct 160 towards the duct opening 126 (e.g., as shown in FIG. 2B). The movable duct 160 may extend along a linear path, and the duct drive linkage 170 may be controlled (e.g., expanding and retracting), because of the one or more supports 110. In other words, the movable duct 160 is forced to follow the linear path provided by the one or more supports 110. Additionally, in such embodiments including a second movable duct on the opposite side from the movable duct 160, the torque from rotating the bypass door 140 may pass from the actuator 180 side to the second movable duct side (e.g., as shown in FIG. 4) and move the second movable duct similar to the movable duct 160. Further, the bypass drive linkage 150 and the duct drive linkage 170 may include splined drive arms and shafts (e.g., to more easily install and disassemble the system in case the bypass door 140 needs to be replaced).

Although the bypass door 140 rotates between its open and closed positions and the movable ducts 160 translate between their open and closed positions in the depicted illustrative embodiments, one or more alternative embodiments of the airflow control systems 100 as described herein may operate through any motion or motions effective to open and close the corresponding opening. For example, the bypass doors in alternative systems may translate between their open and closed positions and/or the movable ducts may rotate between their open and closed positions. In still other embodiments, combinations of rotational and translational movements may be used to move bypass doors and/or movable ducts.

Figure 6:
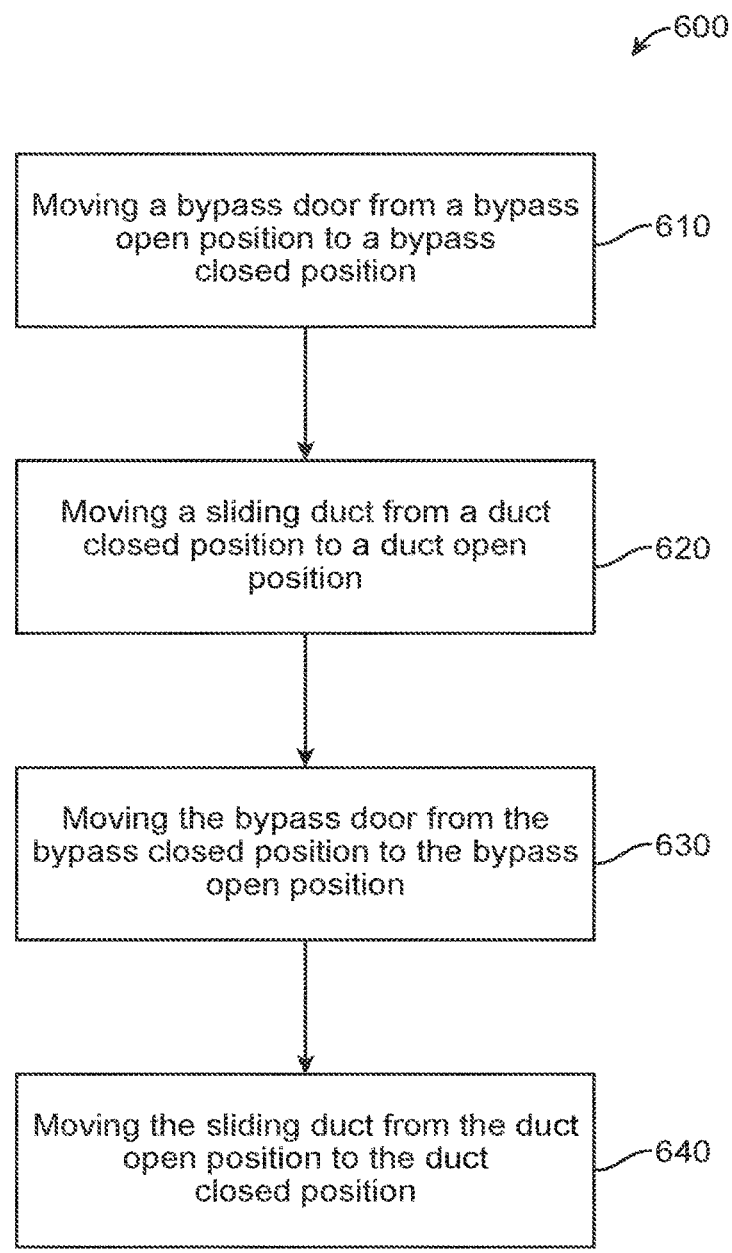
FIG. 6 is a method of airflow control for an aircraft.

One illustrative embodiment of a method 600 of airflow control for a vehicle is illustrated in FIG. 6. The method 600 may include moving 610 a bypass door (e.g., bypass door 140) from a bypass open position (e.g., allowing air to pass through a bypass opening) to a bypass closed position (e.g., preventing air from passing through the bypass opening). The method 600 may also include moving 620 a movable duct (e.g., movable duct 160) from a duct closed position (e.g., preventing air from passing through the duct opening) to a duct open position (e.g., allowing air to pass through the duct opening). The moving 610 of the bypass door from the bypass open position to the bypass closed position may occur simultaneously with the moving 620 of the movable duct from the duct closed position to the duct open position.

Further, the method 600 may include moving 630 the bypass door from the bypass closed position to the bypass open position and moving 640 the movable duct from the duct open position to the duct closed position. The moving 630 of the bypass door from the bypass closed position to the bypass open position may occur simultaneously with the moving 640 of the movable duct from the duct open position to the duct closed position.

In one or more embodiments, moving the bypass door between the bypass open position and the bypass closed position may include transitioning through a bypass intermediate position and moving the movable duct between the duct closed position and the duct open position may include transitioning through a duct intermediate position. The bypass door may transition through the bypass intermediate position at the same time that the movable duct transitions through the duct intermediate position. This transition of each of the bypass door and the movable duct may help to ensure that at least one of the bypass opening and the duct opening are always at least partially open. For example, air may pass through the bypass opening when the bypass door is in the bypass intermediate position and air may pass through the duct opening when the movable duct is in the duct intermediate position.

In one or more embodiments, moving the bypass door from the bypass open position to the bypass closed position and moving the movable duct from the duct closed position to the duct open position may include moving a linear drive shaft of an actuator from a first position (e.g., a position retracted towards the housing of the actuator) to a second position (e.g., a position extended away from the housing of the actuator). Further, moving the bypass door from the bypass closed position to the bypass open position and moving the movable duct from the duct open position to the duct closed position may include moving the linear drive shaft of the actuator from the second position to the first position. The first position and the second position may be located (e.g., the actuator and/or linear drive shaft thereof may be positioned and configured to move in any suitable way) such that the bypass door and the movable duct move as described herein.

In the preceding description, reference is made to the accompanying set of drawings that form a part hereof and in which are shown by way of illustration several specific embodiments. It is to be understood that other embodiments are contemplated and may be made without departing from (e.g., still falling within) the scope of the present disclosure. The preceding detailed description, therefore, is not to be taken in a limiting sense. All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

As used herein, "have", "having", "include", "including", "comprise", "comprising" or the like are used in their open-ended sense, and generally mean "including, but not limited to". It will be understood that "consisting essentially of", "consisting of", and the like are subsumed in "comprising," and the like.

It is noted that terms such as "top", "bottom", "above, "below", etc. may be used in this disclosure. These terms should not be construed as limiting the position or orientation of a structure, but should be used as providing spatial relationship between the structures.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. The disclosed embodiments are presented for purposes of illustration and not limitation.

What is claimed is:

1. An airflow control system for a vehicle comprising:
an airflow housing defining an airflow passageway extending between a bypass opening and an intake outlet, wherein the airflow housing further defines a duct opening positioned between the bypass opening and the intake outlet, wherein the intake outlet is in fluid communication with an engine intake of the vehicle such that air passes from the bypass opening and/or the duct opening to the engine intake, wherein the airflow housing comprises one or more supports;
a movable duct movably connected to the airflow housing to selectively allow or prevent air passage through the duct opening and into the engine intake, wherein the movable duct is movably coupled to the one or more supports to move linearly along the one or more supports, wherein the one or more supports extend along an axis such that the movable duct is adapted to move linearly along the one or more supports along the axis; and a bypass door movably connected to the airflow housing to selectively allow or prevent air passage through the bypass opening and into the engine intake,
wherein at least one of the bypass opening and the duct opening is at least partially open at any given time.

2. The airflow control system of claim 1, wherein movement of the movable duct is interrelated to movement of the bypass door.

3. The airflow control system of claim 1, wherein the movable duct is movable between a duct open position to allow air to pass through the duct opening and a duct closed position to prevent air from passing through the duct opening, and wherein the bypass door is movable between a bypass open position to allow air to pass through the bypass opening and a bypass closed position to prevent air from passing through the bypass opening, wherein the movable duct moves from the duct open position to the duct closed position when the bypass door moves from the bypass closed position to the bypass open position, and wherein the movable duct moves from the duct closed position to the duct open position when the bypass door moves from the bypass open position to the bypass closed position.

4. The airflow control system of claim 1, wherein the movable duct is movable between a duct open position to allow air to pass through the duct opening and a duct closed position to prevent air from passing through the duct opening, and wherein the bypass door is movable between a bypass open position to allow air to pass through the bypass opening and a bypass closed position to prevent air from passing through the bypass opening, wherein the movable duct is in the duct open position when the bypass door is in the bypass closed position, and wherein the movable duct is in the duct closed position when the bypass door is in the bypass open position.

5. The airflow control system of claim 1, further comprising an actuator configured to move both the bypass door and the movable duct.

6. The airflow control system of claim 1, further comprising a first actuator configured to move the bypass door and a second actuator configured to move the movable duct, wherein the first actuator is different than the second actuator.

7. The airflow control system of claim 1, further comprising:
an actuator coupled to the airflow housing and comprising a linear drive shaft configured to extend and retract in a linear direction, and
a bypass drive linkage extending between a first end portion and a second end portion, wherein the first end portion of the bypass drive linkage is pivotally connected to the airflow housing about a pivot axis and fixedly coupled to the bypass door such that the bypass door pivots about the pivot axis, wherein the second end portion of the bypass drive linkage is pivotally connected to the linear drive shaft of the actuator, wherein linear movement of the linear drive shaft of the actuator translates to rotational movement of the bypass door through the bypass drive linkage.

8. The airflow control system of claim 7, further comprising a duct drive linkage extending between a first end portion movably coupled to the movable duct and a second end portion fixedly coupled to the first end portion of the bypass drive linkage, wherein rotational movement of the bypass drive linkage translates to linear movement of the movable duct through the duct drive linkage due to the one or more supports.

9. The airflow control system of claim 1, further comprising a filter assembly positioned outside of the duct opening such that air passing from the duct opening to the engine intake must pass through the filter assembly before passing through the duct opening.

10. The airflow control system of claim 1, wherein the movable duct comprises a first movable duct and a second movable duct and the duct opening comprises a first duct opening and a second duct opening, wherein the first and second movable ducts are movably connected to the airflow housing to selectively allow or prevent air passage through the first and second duct openings, respectively, and into the engine intake.

11. The airflow control system of claim 1, wherein the bypass door is pivotally coupled to the airflow housing within the bypass opening such that the bypass door pivots about a pivot axis between a bypass open position to allow air passage through the bypass opening and a bypass closed position to prevent air passage through the bypass opening.

12. An aircraft comprising:
an engine housing defining an engine intake to receive air flow, wherein the engine housing is configurable between a bypass configuration and a filtered configuration; and
an airflow control system comprising:
an airflow housing defining an airflow passageway extending between a bypass opening and an intake outlet, wherein the airflow housing further defines a duct opening positioned between the bypass opening and the intake outlet, wherein the intake outlet is in fluid communication with the engine intake of the engine housing such that air passes from the bypass opening and/or the duct opening to the engine intake, wherein the airflow housing comprises one or more supports, a movable duct movably connected to the airflow housing to selectively allow or prevent air passage through the duct opening and into the engine intake, wherein the movable duct is movably coupled to the one or more supports to move linearly along the one or more supports, wherein the one or more supports extend along an axis such that the movable duct is adapted to move linearly along the one or more supports along the axis, and a bypass door movably connected to the airflow housing to selectively allow or prevent air passage through the bypass opening and into the engine intake, wherein at least one of the bypass opening and the duct opening is at least partially open at any given time, wherein the movable duct prevents air from passing through the duct opening and the bypass door allows air to pass through the bypass opening when in the bypass configuration, and wherein the movable duct allows air to pass through the duct opening and the bypass door prevents air passing through the bypass opening when in the filtered configuration.

13. The aircraft of claim 12, wherein movement of the movable duct is interrelated to movement of the bypass door.

14. The aircraft of claim 12, wherein the airflow control system further comprises an actuator configured to move both the bypass door and the movable duct.

15. The aircraft of claim 12, wherein the airflow control system further comprises a first actuator configured to move the bypass door and a second actuator configured to move the movable duct, wherein the first actuator is different than the second actuator.

16. The aircraft of claim 12, wherein the airflow control system further comprises a filter assembly positioned outside of the duct opening such that air passing from the duct opening to the engine intake must pass through the filter assembly before passing through the duct opening.

17. An aircraft comprising:
an engine housing defining an engine intake to receive air flow, wherein the engine housing is configurable between a bypass configuration and a filtered configuration; and
an airflow control system comprising:
an airflow housing defining an airflow passageway extending between a bypass opening and an intake outlet, wherein the airflow housing further defines a duct opening positioned between the bypass opening and the intake outlet, wherein the intake outlet is in fluid communication with the engine intake of the engine housing such that air passes from the bypass opening and/or the duct opening to the engine intake,
a movable duct movably connected to the airflow housing to selectively allow or prevent air passage through the duct opening and into the engine intake, and
a bypass door movably connected to the airflow housing to selectively allow or prevent air passage through the bypass opening and into the engine intake,
an actuator coupled to the airflow housing and comprising a linear drive shaft configured to extend and retract in a linear direction;
a bypass drive linkage extending between a first end portion and a second end portion, wherein the first end portion of the bypass drive linkage is pivotally connected to the airflow housing about a pivot axis and fixedly coupled to the bypass door such that the bypass door pivots about the pivot axis, wherein the second end portion of the bypass drive linkage is pivotally connected to the linear drive shaft of the actuator, wherein linear movement of the linear drive shaft of the actuator translates to rotational movement of the bypass door through the bypass drive linkage;
one or more supports extending along the airflow housing, wherein the movable duct is movably coupled to the one or more supports to move linearly along the one or more supports; and
a duct drive linkage extending between a first end portion movably coupled to the movable duct and a second end portion fixedly coupled to the first end portion of the bypass drive linkage, wherein rotational movement of the bypass drive linkage translates to linear movement of the movable duct through the duct drive linkage due to the one or more supports,
wherein the movable duct prevents air from passing through the duct opening and the bypass door allows air to pass through the bypass opening when in the bypass configuration, and wherein the movable duct allows air to pass through the duct opening and the bypass door prevents air passing through the bypass opening when in the filtered configuration.

18. The aircraft of claim 17, wherein movement of the movable duct is interrelated to movement of the bypass door.

19. The aircraft of claim 17, wherein at least one of the bypass opening and the duct opening is at least partially open at any given time.

20. The aircraft of claim 17, further comprising a filter assembly positioned outside of the duct opening such that air passing from the duct opening to the engine intake must pass through the filter assembly before passing through the duct opening.

21. An airflow control system for a vehicle comprising:
an airflow housing defining an airflow passageway extending between a bypass opening and an intake outlet, wherein the airflow housing further defines a duct opening positioned between the bypass opening and the intake outlet, wherein the intake outlet is in fluid communication with an engine intake of the vehicle such that air passes from the bypass opening and/or the duct opening to the engine intake;
a movable duct movably connected to the airflow housing to selectively allow or prevent air passage through the duct opening and into the engine intake;
a bypass door movably connected to the airflow housing to selectively allow or prevent air passage through the bypass opening and into the engine intake;
an actuator coupled to the airflow housing and comprising a linear drive shaft configured to extend and retract in a linear direction;
a bypass drive linkage extending between a first end portion and a second end portion, wherein the first end portion of the bypass drive linkage is pivotally connected to the airflow housing about a pivot axis and fixedly coupled to the bypass door such that the bypass door pivots about the pivot axis, wherein the second end portion of the bypass drive linkage is pivotally connected to the linear drive shaft of the actuator, wherein linear movement of the linear drive shaft of the actuator translates to rotational movement of the bypass door through the bypass drive linkage;

one or more supports extending along the airflow housing, wherein the movable duct is movably coupled to the one or more supports to move linearly along the one or more supports; and a duct drive linkage extending between a first end portion movably coupled to the movable duct and a second end portion fixedly coupled to the first end portion of the bypass drive linkage, wherein rotational movement of the bypass drive linkage translates to linear movement of the movable duct through the duct drive linkage due to the one or more supports.

22. The airflow control system of claim 21, wherein movement of the movable duct is interrelated to movement of the bypass door.

23. The airflow control system of claim 21, wherein the movable duct is movable between a duct open position to allow air to pass through the duct opening and a duct closed position to prevent air from passing through the duct opening, and wherein the bypass door is movable between a bypass open position to allow air to pass through the bypass opening and a bypass closed position to prevent air from passing through the bypass opening, wherein the movable duct moves from the duct open position to the duct closed position when the bypass door moves from the bypass closed position to the bypass open position, and wherein the movable duct moves from the duct closed position to the duct open position when the bypass door moves from the bypass open position to the bypass closed position.

24. The airflow control system of claim 21, wherein the movable duct is movable between a duct open position to allow air to pass through the duct opening and a duct closed position to prevent air from passing through the duct opening, and wherein the bypass door is movable between a bypass open position to allow air to pass through the bypass opening and a bypass closed position to prevent air from passing through the bypass opening, wherein the movable duct is in the duct open position when the bypass door is in the bypass closed position, and wherein the movable duct is in the duct closed position when the bypass door is in the bypass open position.

25. The airflow control system of claim 21, wherein at least one of the bypass opening and the duct opening is at least partially open at any given time.

26. The airflow control system of claim 21, further comprising a filter assembly positioned outside of the duct opening such that air passing from the duct opening to the engine intake must pass through the filter assembly before passing through the duct opening.

27. The airflow control system of claim 21, wherein the movable duct comprises a first movable duct and a second movable duct and the duct opening comprises a first duct opening and a second duct opening, wherein the first and second movable ducts are movably connected to the airflow housing to selectively allow or prevent air passage through the first and second duct openings, respectively, and into the engine intake.

28. The airflow control system of claim 21, wherein the bypass door is pivotally coupled to the airflow housing within the bypass opening such that the bypass door pivots about a pivot axis between a bypass open position to allow air passage through the bypass opening and a bypass closed position to prevent air passage through the bypass opening.

* * * * *